United States Patent [19]
Lumby et al.

[11] 3,991,148
[45] Nov. 9, 1976

[54] METHOD OF FORMING CERAMIC PRODUCTS

[75] Inventors: Roland John Lumby, Birmingham; Roger Rostron Wills, Hampton Magna; Richard Frederick Horsley, Solihull, all of England

[73] Assignee: Joseph Lucas (Industries) Limited, Birmingham, England

[22] Filed: Nov. 14, 1975

[21] Appl. No.: 632,108

Related U.S. Application Data

[63] Continuation of Ser. No. 398,822, Sept. 19, 1973, abandoned.

[30] Foreign Application Priority Data

Nov. 1, 1972  United Kingdom............... 50269/72
Nov. 1, 1972  United Kingdom............... 50270/72
Mar. 29, 1973  United Kingdom............... 15048/73

[52] U.S. Cl.................................. 264/56; 106/62; 106/65; 106/73.4; 106/73.5; 264/65; 423/327
[51] Int. Cl.²................... C04B 33/32; C04B 35/58
[58] Field of Search................. 106/73.4, 62, 65; 423/327; 264/56, 65

[56] References Cited
UNITED STATES PATENTS 3,903,230   9/1975   Kamigaito et al..................... 264/65

OTHER PUBLICATIONS

Jack K. H. et al., "Ceramics Based on the Si—Al—O—N and Related Systems," Nature, Phys. Science 238, July 10, 1972, pp. 28–29.

Oyama; Y., "Solid Solution in the Ternary System, $Si_3N_4$—AlN—$Al_2O_3$," Japan, J. Appl. Phys. 11, No. 5 (1972), pp. 760–761.

Masak H. et al., "Low Temperature Synthesis of Silicon Nitride Solid Solution," Japan, J. Appl. Phys. 14, No. 2, pp. 301–302 (Feb. 1975).

*Primary Examiner*—Helen M. McCarthy
*Attorney, Agent, or Firm*—Holman & Stern

[57] ABSTRACT

In a method of forming a refractory product wherein a mixture consisting of effective amounts of silica, alumina, aluminium nitride, and with or without silicon nitride, is provided, the mixture is surrounded with a protective medium and sintered at a temperature between 1200°–2000° C to form a single phase silicon aluminium oxynitride corresponding to the formula: $Si_{6-z}Al_zN_{8-z}O_z$, where $z$ is greater than zero and less than or equal to 5, and when there is no silicon nitride in the mixture $z$ is greater than or equal to 4 and less than or equal to 5, the improvement being the step of introducing into said mixture magnesium oxide in an amount of not more than 5% by weight to form a magnesium silicate glass and aid in densification of the ceramic material.

7 Claims, 2 Drawing Figures

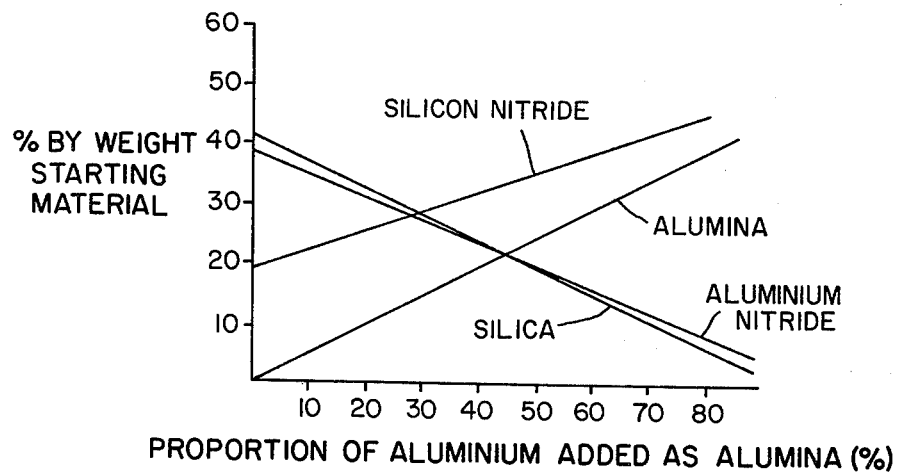
FIG. I
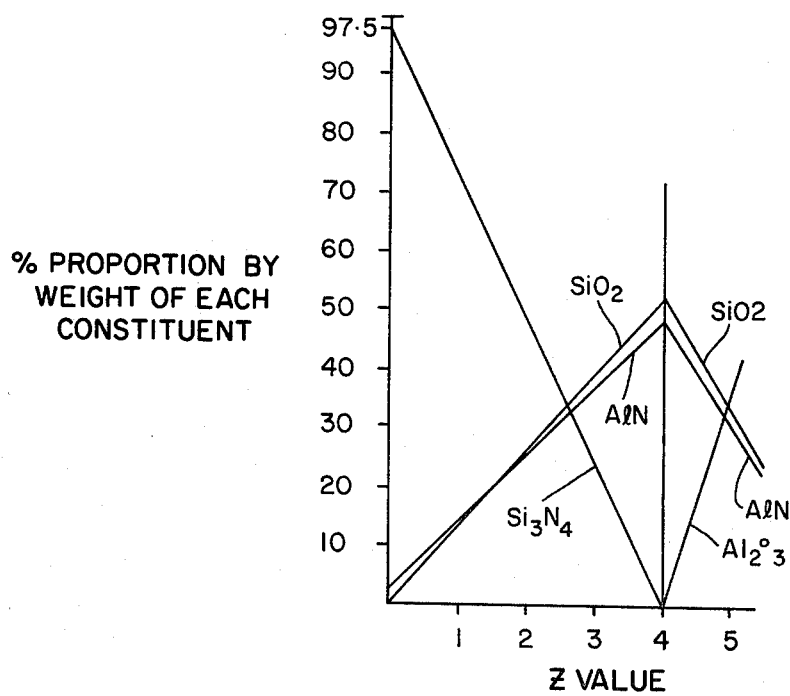
FIG. 2

METHOD OF FORMING CERAMIC PRODUCTS

This is a continuation of application Ser. No. 398,822 filed Sept. 19, 1973, now abandoned.

This invention relates to a method of forming silicon aluminum oxynitride ceramic materials corrsponding to the general formula (I):

where z is greater than zero and less than or equal to 5.

Reference is made to copending application dealing with the same subject matter, namely, Jack et al., U.S. Ser. No. 566,605, filed Apr. 8, 1975, which, in turn, was a Rule 60 Continuation of U.S. Ser. No. 322,778, filed Jan. 11, 1973, now abandoned.

One aspect of the invention deals with a method of forming a refractory product wherein a mixture consisting essentially of effective amounts of silica, alumina, aluminum nitride and silicon nitride are provided and the relative proportions of the silica, alumina, aluminum nitride and silicon nitride are such that there is formed, after surrounding with the protective medium and sintering at a temperature between 1200°–2000° C a ceramic material consisting of a single phase silicon aluminium oxynitride corresponding to the formula:

where z is greater than zero and less than or equal to 5, the improvement being the step of introducing into said mixture magnesium oxide in an amount of not more than 5% by weight to form a magnesium silicate glass and aid in densification of said ceramic material.

Preferably at least part of the silica in said mixture is present as an impurity contained by the silicon nitride.

Preferably at least part of the alumina in said mixture is contained as an impurity in the aluminium nitride.

Preferably alumina and silica are provided in the mixture by way of a compound of alumina and silica being introduced into the starting materials used to produce the mixture.

A second aspect of the invention of forming a refractory product wherein a mixture consisting essentially of effective amounts of silica, alumina, and aluminium nitride are provided and the relative proportions of the silica, alumina and aluminium nitride are such that there is formed after surrounding with a protective medium a sintering at a temperature of between 1200°–200° C, a ceramic material consisting of a single phase silicon aluminium oxynitride corresponding to the formula:

where z is greater than or equal to 4 and less than or equal to 5, the improvement being the step of introducing into said mixture magnesium oxide in an amount of not more than 5% by weight to form a magnesium silicate glass and aid in densification of said ceramic material.

Preferably at least part of the alumina present in said misture is contained as an impurity in the aluminium nitride.

Preferably alumina and silica are provided in said mixture by means of a compound of alumina and silica being introduced into the starting materials used to produce the mixture.

In a first example of the invention, a single phase silicon aluminium oxynitride ceramic material corresponding to formula (I) was produced from a starting mixture consisting of: 97.5% by weight of silicon nitride powder containing 89% of the $\alpha$ - phase material having a mean particle size of 8 microns and 2.5% by weight of aluminium nitride powder as supplied by Koch-Light as type "8006H" and having a mean particle size of 50 microns. It was however, known that the silicon nitride powder inherently contained silica as a coating over the particles of silicon nitride, and moreover that the aluminium nitride powder inherently contained an impurity of alumina. As will be readily understood, both of these impurities affected the subsequent reaction to produce the silicon aluminium oxynitride ceramic material since they contributed silicon, aluminium and oxygen to the reaction. Thus, before mixing the starting materials described above, the impurity levels in the silicon nitride and aluminium nitride to be employed were first determined by fast neutron activation analysis. Using the particular starting materials described above, it was found that the silica content of the silicon nitride powder was 2.6% by weight and the alumina content of the aluminium nitride was 4.25 % by weight.

To produce the required mixture, the required amounts of the starting materials were introduced into a colloid mill where mixing was effected using iso-propyl alcohol as the carrier liquid and until the mean particle size of the mixture was 5 microns. The mixture was then dried and sieved to remove any powder aggregates. Thereafter, an impurity determination was performed on the starting mixture to ascertain what effect, if any, the processing had had on the impurity levels of the starting materials, but it was found that the latter had not been altered by the colloid milling and the drying and sieving operations.

The mixture was then loaded into the die cavity of a graphite die onto a graphite plug closing one end of the die cavity. A graphite punch was then assembled onto the powder charge, all graphite surfaces in contact with the powder charge having previously been spray coated with boron nitride to a depth of the order of 0.01 inch. The assembly was then introduced into a press, where the temperature and pressure were simultaneously increased, over a period of 30 minutes to 1750° C and 1.5 tons square inch respectively. The mixture was then maintained at this temperature and pressure for 1 hour and, under these conditions, produced a reactable composition in which allowing for the impurities in the starting materials, the atomic ratio of silicon: aluminium: nitrogen: oxygen, were substantially in the proportions 6-z:z 8-z:z respectively, where z was equal to 0.2. Thus, the components of the reactable composition reacted together to produce a refactory product containing the required silicon aluminium oxynitride corresponding to formula (I) with z being approximately equal to 0.2 which when the reaction product was removed from the die and subjected to X-ray analysis, was found to constitute the entire ceramic phase of the product.

To confirm the above observations, the procedure of the first example was repeated but with the quantity of aluminium nitride in the starting mixture being increased to 30% by weight. Thus the aluminium nitride level was now considerably greater than that required to produce a single phase silicon aluminium oxynitride ceramic material of the kind specified. Although such a ceramic material was detected in the resultant product by X-ray analysis, as expected a large amount of free aluminium nitride was also present.

Having demonstrated the affinity which aluminium nitride has for silica in producing a silicon aluminium oxynitride which can react with any silicon nitrides which may be present, it will be seen that aluminium nitride can be a useful starting material for producing single phase silicon aluminium oxynitrides employing it in conjunction with silicon nitride and/or added silica, in the presence or absence of added alumina. Providing the proper atomic balance is maintained in the starting materials, a single phase silicon aluminium oxynitride corresponding to formula (I) results. Thus in a second example of the invention, a silicon aluminium oxynitride corresponding to formula (I) was produced from a mixture containing 19.5% by weight of silicon nitride and 39.5% by weight of the aluminium nitride powders of the first example, but in this case a different batch of the starting material was used and it was found that the silicon nitride contained 2.5% by weight of silica and that the aluminium nitride contained 5% by weight of alumina. Moreover, in this example, additional silica to that present as an impurity on the silicon nitride was introduced into the starting mixture, the silica being that supplied by Hopkin and Williams Limited as pure precipitated silica and constituting the mixture. The procedure of the first example was followed and the resultant product on X-ray analysis, was found to comprise a refractory product having a ceramic phase consisting entirely of a single phase silicon aluminium oxynitride corresponding to formula (I) and with a $z$ value of about 3.3.

From the above it will be appreciated that each time a particular batch of starting materials was made up into a mixture for the production of a given silicon aluminium oxynitride, it was necessary to take into account the effect of the inherent impurities in the starting materials. Thus, in order to facilitate this operation, the amounts of silicon, aluminium, oxygen and nitrogen contributed by each of the required starting materials, together with the impurities inherent in these materials, were computed, from which it was possible to calculate for each silicon aluminium oxynitride to be produced the various mixtures of the starting materials which would yield a reactable composition having the required atomic proportions of aluminium, silicon, oxygen and nitrogen at the elevated temperature of the reaction. FIG. 1 of the accompanying drawings shows graphically the results of such a computation when applied to the production of the silicon aluminium oxynitride of the second example. In this graph, the silicon nitride, aluminium nitride and silica starting materials are those employed in the second example, although it will also be noted that the graph also includes alumina as a starting material, the alumina being that supplied by the Aluminium Company of America as type XA16. Other graphs were of course prepared for producing silicon aluminium oxynitrides having different relative proportions of silicon, aluminium, oxygen and nitrogen. It will be readily appreciated that the graphs considerably simplified the preparations of reaction mixtures from particular batches of starting materials, although of course it was necessary to produce new graphs when a particular batch was exhausted.

From FIG. 2 it can be seen that, by employing starting mixtures containing varying propertions of silicon nitride, aluminium nitride and silica and without any added alumina, it is possible to produce materials in which the entire ceramic phase is silicon aluminium oxynitride of $z$ value greater than zero and less than or equal to 4.0. In this respect it is to be understood that in the graph of FIG. 2, allowance has been made for the impurities in the various starting materials, that is the silica inherent in the silicon nitride and the alumina inherent in the aluminium nitride. Thus it will be noted that the $z$ value increases progressively up to 4.0 as the aluminium nitride content of the starting mixture is increased up to approximately 50% by weight, while at the same time the silica content is increased to approximately 50% by weight and the silicon nitride content is decreased from approximately 97.5% by weight. However, it will be seen that at $z = 4.0$ it is no longer possible to control the $z$ value with silicon nitride and it becomes necessary to introduce alumina into the mix. Moreover, it will be noted that $z$ values above 4.0 and up to 5 can be obtained in the absence of silicon nitride, by progressively reducing the aluminium nitride content from approximately 50% by weight while at the same time reducing the silica content from approximately 50% by weight and increasing the alumina content to approximately 35% by weight. However, although FIG. 2 demonstrates that silicon aluminium oxynitrides can be obtained in the absence of added alumina, and having $z$ values between 4.0 and 5 can be obtained in the absence of silicon nitride, it is to be understood that silicon aluminium oxynitrides with $0 \leq z \leq 5$ can be produced at the sintering temperature when all four constituents are present in the starting mixture. In such a case, the mixture would contain up to 50% by weight of aluminium nitride, up to 50% by weight of silica, and up to 75% by weight of alumina, with the silicon nitride making up the remainder. Moreover, it is to be understood that silicon aluminium oxynitride with $o \leq z \leq 5$ can be produced in the absence of added silica, where silicon nitride and alumina are the main reactants and aluminium nitride is used to convert the silica on the silicon nitride to silicon aluminium oxynitride, in which case the alumina would be added up to approximately 75% by weight of the mixture, the aluminium nitride content being low of the order of 2 to 5% by weight. Further, it can be seen from FIG. 2 that a product in which the ceramic phase is entirely silicon aluminium oxynitride with $z$ equal to 4.0 can be produced by reacting aluminium nitride with silica alone, the relative proportions being 1:1 molar ratio, which is approximately 50:50 weight percent. It should however be realised that inherently in such a mix, alumina is present, but as previously stated this has been catered for on the graph.

In a third example of the invention, the graph shown in FIG. 1 was used to enable the silicon aluminium oxynitride of the second example to be produced from a different mixture of the starting materials. The mixture consisted of 10% by weight of alumina, 26% by weight of silicon nitride, 31.5% by weight of aluminium nitride and 32.5% by weight of silica. On being hot pressed by the technique of the first example, the mixture again yielded a product in which the ceramic phase consisted entirely of the silicon aluminium oxynitride produced previously. Moreover, the hot pressed product was of high density, that is 3.05 gm/c.c.

In a fourth example, a silicon aluminium oxynitride was prepared from a mixture of the silica, alumina and aluminium nitride powders of the second example in which the mixture comprised 40.7% by weight of aluminium nitride, 42.5% by weight of silica and 16.8 % by weight of alumina. The mixture was hot pressed using the procedure described in the first example, and at the hot pressing temperature, produced a reactable composition in which the atomic ratio of silicon: aluminium: nitrogen: oxygen was 6-$z$:$z$:8-$z$:$z$ where $z$ was equal to 4.5. Hot pressing therefore yielded a product in which the ceramic phase consisted entirely of silicon alumiinium oxynitride corresponding to formula (I) but the density of the product was low.

In a fifth example, the procedure of the previous example was repeated with a mixture consisting of 48.5% by weight of aluminium nitride and 51.5% by weight of silica. In this case at the hot pressing temperature a reactable composition was produced, in which the atomic proportions of silicon: aluminum: nitrogen: oxygen were the same as the ratio given above, but had a $z$ value of 4.0. The ceramic phase of the resultant product was found to consist entirely of the expected silicon aluminium oxynitride corresponding to formula (I).

In a sixth example, the silicon nitride and aluminium nitride powders used in the first example were mixed with the alumina powder of the third example to produce a mixture consisting of 86.5% by weight of silicon nitride, 10% by weight of alumina, and 3.5% by weight of aluminium nitride. The mixture was hot pressed as in the previous examples, with the hot pressing temperature being held between 1650° C and 1750° C for at least 1 hour. At the hot pressing temperature, the mixture defined a reactable composition in which the atomic proportions of silicon: aluminium: nitrogen:oxygen were the same as the ratio given above but with $z$ being equal to 1.1. Thus, as expected from the previous results, the ceramic phase of the hot pressed product was found to consist entirely of a silicon aluminium oxynitride corresponding to formula (I) with a $z$ value of 1.1 although the density of the product, 2.2 gm/c.c, was low.

In the example given above, although the reaction products have consistently been single phase ceramic materials of the kind specified, their density values have varied widely and, in the main have been low (of the order of 2.2 gm/c.c.), with their strength values being of the order of 20,000 – 30,000 p.s.i. While it would be possible to improve these properties by comminuting the reaction products and subjecting them to a hot densification process in the presence of a densifying agent which is molten at the elevated temperature of the process, it is also possible to include the densifying agent in the starting mixture.

Thus, in a seventh example, the procedure of the previous example was repeated, but the amount of silicon nitride in the reaction mixture was increased to 89% by weight, while the amount of aluminium nitride was decreased to 1% by weight. It was believed that the effect of these alterations would be to produce, at the elevated temperature of hot pressing, firstly a reactable composition having an atomic ratio as defined above in which $z$ was equal to 0.9, and secondly excess silica and excess alumina in addition to the reactable composition. Further it was believed that during the hot pressing the excess alumina and silica would produce an alumino-silicate glass ($Al_2O_3.SiO_2$) which would be molten at the hot pressing temperature and would therefore aid densification of the material being pressed. These assumptions were supported by the fact that a high density value of 3.1 gm/c.c. was obtained for the reaction product, in which the ceramic phase consisted entirely of a single phase silicon aluminium oxynitride corresponding to formula (I) and having a $z$ value of about 0.9. In addition to having a high density, the product was found to have a mean modulus rupture value at a room temperature of 73,000 p.s.i., which decreased to 67,000 p.s.i. at 1200° C and 36,000 p.s.i. at 1400° C. Creep tests were also carried out on the product and at 1200° C the product was found to undergo only 0.05% creep when subjected to an applied load of 5 tons/square inch for 100 hours. In view of these results, it will be understood that the product of this example was suitable for use in environments requiring good modulus rupture values and high creep strength at elevated temperatures, for example in rotor blades for gas turbine engines.

As a further demonstration of the effect observed in the seventh example, the process of the sixth example was repeated but with the aluminium nitride level reduced from 3.5 to 2.5% by weight and the silicon nitride content to 87% by weight. It was observed that the density of the resultant product was increased from 2.2 to 2.85 gm/c.c., and the mean modulus of rupture at room temperature was increased to 63,000 p.s.i.

From the above it will be seen that, by ensuring that a glass was formed at the hot pressing temperature as well as the required silicon aluminium oxynitride, it was possible to ensure that hot pressing produced a dense and therefore strong product. Moreover, it was found that the resultant glass had no adverse effects on the properties of the resultant porduct, even when relatively large quantities of glass were present.

Although in the seventh example, the glass formation was brought out by decreasing the aluminium nitride present, thereby allowing more silica to be available for glass formation with the alumina present it is to be appreciated that other techniques for controlling the glass could have been used. For example, an alumina/silica combination of a desired glass composition could have been added to the starting mix.

However, since glasses based on $Al_2O_3.SiO_2$ are high melting point glasses (1595° C) some difficulty with hot pressing may be found. Therefore other densifying agents forming glasses with lower melting points could be used, e.g. magnesium oxide which forms magnesium glasses which melt between 1350°–1450° C.

Thus in an eight example, the aluminium nitride powder employed in the first example was mixed with magnesium oxide powder as supplied by Hopkin and Williams Limited and termed "Light", and silicon nitride powder which from fast neutron activation was found would contribute 6% by weight of silica to the mixture. The powders were ball milled for 24 hours in iso-propyl alcohol using alumina balls to produce a mixture consisting of 94.5% by weight of silicon nitride, 5% by weight of aluminium nitride and 0.5% by weight of magnesium oxide. The mixture was then dried and introduced into the graphite die used previously, whereafter the sample was hot pressed by increasing the temperature and pressure simultaneously to 3000 p.s.i. and 1680° C respectively. The sample was held at this temperature and pressure until full densification was reached, this being indicated by no further movement of the punches and occurring after approximately 20 minutes. The temperature was then raised to 1760° C over a period of about 4 minutes, the pressure being held at 3000 p.s.i., whereafter the sample was maintained under these conditions for approximately 40 minutes. During hot pressing, the mixture produced a reactable composition in which the atomic ratio of silicon: aluminium: nitrogen: oxygen was 6-$z$:$z$ 8-$z$:$z$ respectively, where $z$ was equal to 0.4. However, in addition to the reactable composition some silica and alumina were present from the grinding media, which it is believed at the hot pressing temperature reacted with the magnesium oxide present to form a magnesium aluminosilicate glass, which aided densification of the product. Thus, the product was again found to have a high density value of 3.09 gm/c.c., the mean modulus rupture of the product being 74,000 p.s.i. at 1100° C, 64,000 p.s.i. at 1200° C and 47,000 p.s.i. at 1375° C.

In order to reduce the quantity of glass present at the pressing temperature, the eighth example was repeated with decreasing amounts of magnesium oxide present. As expected, this was found to cause the density and strength of the hot pressed product to fall. For example, when the method of the eighth example was repeated with 0.25 % by weight of magnesium oxide present, the resultant product has a density of 3.08 gm/c.c. and a mean modulus of rupture value at room temperature of 58.200 p.s.i.

It will be appreciated that while it is convenient to introduce glass forming agents into the starting mixture by ball milling the constituents using appropirate balls, this reduces the control over the amount of glass produced. It is therefore preferred to use a milling techinque whereby such control is improved, e.g. colloid milling, and to introduce all the glass forming agents in measured quantities.

Thus in a ninth example, the starting mixture of the first example was again prepared, but with some of the silicon nitride now being replaced by magnesium oxide powder and silica powder, both powders being those used previously. The resultant mixture consisted of 2.5by weight of aluminium nitride, 1% by weight of silica, 1% by weight of magnesium oxide, and 95.5% by weight of silicon nitride. The mixture was introduced into a colloid mill and mixed in iso-propyl alcohol until the mean particle size of the mixture was 5 microns whereafter the mixture was dried and sieved as in the first example. To effect hot pressing, the mixture was loaded as before into a graphite die and was then heated to 1710° C over a period of 30 minutes, during which time the pressure on the mixture was gradually increased to 1.5 tons/square inch. The mixture was held at this temperature and pressure for 1 hour, whereafter the temperature was increased to 1775° C and the mixture held at this other temperature for a further 35 minutes. At these elevated temperatures, the mixture defined a reactable composition in which the silicon, aluminium, nitrogen and oxygen were present in the required atomic ratio defined above with $z$ having a value approaching that obtained in the first example, that is 0.2. In addition, however, to this reactable composition a silicon: aluminium: nitrogen: oxygen of 6-$z$:$z$:8-$z$:$a$ respectively, with $z$ being approximately equal to 0.2 so that the final product had a density of 3.2 gm/c.c. and a maximum modulus rupture value at a room temperature of 154000 p.s.i. the minimum value being 74,000 p.s.i. and the mean value being 12,000 p.s.i. Creep tests were also carried out on the product and at 1200° C the product was found to undergo 0.5% creep when subjected to an applied load of 5 tons/square inch for 30 hours.

The ninth example was also repeated with decreasing amounts of magnesium oxide present and as expected, the density of the resultant products was decreased.

In a tenth example, the procedure of the previous example was repeated, but with 1 % by weight of the silicon nitride powder being replaced by aluminium nitride powder. It was found that this alteration increased the creep strength of the resultant product so that at 1200° C, the product was found to undergo only 0.3% creep when subjected to an applied load of 5 tons/square inch for 100 hours. However, the strength of the product was slightly reduced as compared with that of the previous example, the mean modulus rupture at a room temperature being 106000 p.s.i. It was believed that these results were caused by some of the silica from the glass-forming silica additive reacting with the excess aluminium nitride and hence reducing the total glass content, while providing a reactable composition having an atomic ratio of silicon: aluminium: nitrogen: oxygen of 6-$z$:$z$:8-$z$:$z$ respectively, with $z$ being approximately equal to 0.2.

To further substantiate the observations of the tenth example, the process was repeated with the aluminium nitride content being further increased at the expense of the silicon nitride content. In this way, it was found to be possible to obtain further improvements in the creep strength and, for example, with a 4.5% by weight addition of aluminium nitride, the product gave only 0.15% creep in 100 hours under the same conditions employed in the previous example. However, as the aluminium nitride content increased, hot pressing became more difficult, which was reflected in decreasing density and strength for the hot pressed product. Thus, in the case of a 4.5% aluminium nitride addition, the hot pressed product had a density of 3.15 gm/c.c. and a mean modulus rupture value at a room temperature of 79,000 p.s.i. Similarly, it was found that variation of the aluminium nitride content in the starting mixture could be used to modify the creep properties of silicon aluminium oxynitride ceramic materials having z values greater than in the above examples.

Thus, in an eleventh example, two starting mixtures were prepared which both gave a silicon aluminium oxynitride having a z value of about 0.8, but which had different aluminium nitride contents. Preferably, the mixtures were produced with the aid of a graph similar to that shown in FIG. 2.

Of these mixtures, the first consisted of 83% by weight of silicon nitride, 10% by weight of aluminium nitride, 6% by weight of silica and 1% by weight of magnesium oxide, whereas the second mixture consisted of 85.49% by weight of silicon nitride, 7.62% by weight of aluminium nitride, 3.33% by weight of silica, 2.56% by weight of alumina, and 1% by weight of magnesium oxide. Thus, the first mixture contained the higher aluminium nitride content and gave a product which, when subjected to a load of 5tons/square inch for 100 hours at 1200° C, only underwent 0.057% creep. As expected, this was an improvement over the value of 0.108% obtained under the same conditions for the product of the second mixture. Once again, however, the increase in creep strength of the product of the first example was accompanied by a decrease in density and mean modulus of rupture at room temperature (3.16 gm/c.c. and 80,000 p.s.i. respectively) as compared with the product of the second example (3.18 gm/c.c. and 86,000 p.s.i. respectively).

It will be noted that where products of high modulus of rupture and high creep strength have been obtained in the above examples, the ceramic phases of the products have been defined by silicon aluminium oxynitride ceramic materials having low z values. In fact, it has been found to be preferable to produce silicon aluminium oxynitride having z values less than about 1.7, or more preferably z values of about 0.8 or less, when products of high strength are required. However, in some cases, products having high corrosion resistance, rather than high strength, are required such as, for example, when the product is to be in contact with liquid steel or any other aggressive slag environment. In such cases it has been found that silicon aluminium oxynitrides having z values greater than about 1.7, and preferably z values of about 3.3, give desirable results. Thus, for example, the product obtained by the method of the first example was found to have a sufficiently high corrosion resistance to enable it to be employed in contact with liquid steel.

While in all the examples quoted, the reactions have taken place at elevated temperature in the presence of pressure being applied to the samples, this has been done so that as few a number of parameters which affect the product, have been altered, thereby enabling a proper assessment to be made of the results to be obtained. However, examples four and five were also repeated in the absence of pressure, the sample having been cold compacted at 2000 p.s.i. in steel dies to form a self supporting block, before being removed from the die and buried in boron nitride contained in a graphite crucible. This assembly was then placed in a furnace and the heating schedule of the earlier experiments was followed. In each case a refractory product was obtained which had a ceramic phase consisting entirely of silicon aluminium oxynitride corresponding to the formula (I).

While the temperatures at which the reactions have taken place have consistently been between 1700° and 1780° C, this temperature range was chosen since it proved a range in which the products were obtained in reasonably short times. However, satisfactory products have been obtained with temperatures as low as 1200° C and as high as 2000° C, but, it was preferred to employ temperatures, of 1500° C or more for more economic reacting of larger samples. The upper limit of temperature will obviously be determined by economy of the process and prevention of the product becoming degraded by long exposure at such temperatures. However, 1800° C is a useful upper limit for use in practice.

It is to be appreciated that where alumina was added to the starting materials of the above examples, the alumina could have been replaced by a compound of aluminium which would have decomposed to alumina during heating to the elevated temperature necessary to produce the required ceramic material. Where both silica and alumina were added to the starting materials of the above examples, an alternative would have been to introduce into the starting materials a compound of these materials which would have provided the required silica and alumina at the elevated temperature of subsequent processing. Moreover, the magnesium oxide employed as a starting material in the above examples could have been replaced by a compound of magnesium which would have decomposed to the oxide during subsequent processing. It was, however, found that, where magnesium oxide or some compound of magnesium was added to the starting materials, the preferred quantity for this addition was less than 5%, or more preferably not more than 1%, by weight of the starting materials.

We claim:

1. In a method of forming a refractory product wherein a mixture consisting essentially of effective amounts of silica, alumina, aluminium nitride and silicon nitride are provided and the relative proportions of the silica, alumina, aluminium nitride and silicon nitride are such that there is formed, after surrounding with the protective medium and sintering at a temperature between 1200°–2000° C, a ceramic material consisting of a single phase silicon aluminium oxynitride corresponding to the formula:

$$Si_{6-z}Al_zN_{8-z}O_z$$

where z is greater than zero and less than or equal to 5, the improvement being the step of introducing into said mixture magnesium oxide in an amount of not more than 5% by weight to form a magnesium silicate glass and aid in densification of said ceramic material.

2. The method as claimed in claim 1 wherein at least part of the silica in said mixture is present as an impurity contained by the silicon nitride.

3. The method as claimed in claim 1, wherein at least part of the alumina in said mixture is contained as an impurity by the aluminium nitride.

4. The method as claimed in claim 1, wherein to provide alumina and silica in said mixture, a compound of alumina and silica is introduced into the starting materials used to produce the mixture.

5. In a method of forming a refractory product wherein a mixture consisting essentially of effective amounts of silica, alumina, and aluminium nitride are provided and the relative proportions of the silica, alumina and aluminium nitride are such that there is formed after surrounding with a protective medium and sintering at a temperature of between 1200°–2000° C, a ceramic material consisting of a single phase silicon aluminum oxynitride corresponding to the formula:

$$Si_{6-z}Al_zN_{8-z}O_z$$

where z is greater than or equal to 4 and less than or equal to 5, the improvement being the step of introducing into said mixture magnesium oxide in an amount of not more than 5% by weight to form a magnesium silicate glass and aid in densification of said ceramic material.

6. A method as claimed in claim 5, wherein at least part of the alumina present in said mixture is contained as an impurity by the aluminium nitride.

7. A method as claimed in claim 5, wherein to provide alumina and silica in said mixture, a compound of alumina and silica is introduced into the starting materials used to produce the mixture.

* * * * *